US007666533B2

(12) United States Patent
Kaeding et al.

(10) Patent No.: US 7,666,533 B2
(45) Date of Patent: Feb. 23, 2010

(54) DETERMINATION OF THE LAMBDA VALUE OF REFORMATE

(75) Inventors: Stefan Kaeding, Zerrenthin (DE); Andreas Reinert, Neubrandenburg (DE)

(73) Assignee: Webasto AG, Stockdorf (DE)

( * ) Notice: Subject to any disclaimer, the term of this patent is extended or adjusted under 35 U.S.C. 154(b) by 743 days.

(21) Appl. No.: 11/007,296

(22) Filed: Dec. 9, 2004

(65) Prior Publication Data

US 2005/0129994 A1 Jun. 16, 2005

(30) Foreign Application Priority Data

Dec. 12, 2003 (DE) ................................ 103 58 933

(51) Int. Cl.
*H01M 8/04* (2006.01)
*H01M 8/06* (2006.01)

(52) U.S. Cl. .............................. 429/17; 429/19; 429/23

(58) Field of Classification Search ....................... None
See application file for complete search history.

(56) References Cited

U.S. PATENT DOCUMENTS 3,886,058 A 5/1975 Barna
4,167,163 A * 9/1979 Moder ........................ 123/688
4,718,999 A * 1/1988 Suzuki et al. ............... 204/406
5,249,453 A * 10/1993 Usami et al. ............... 73/23.32
5,984,986 A * 11/1999 Wiesheu et al. ............... 48/203
6,893,756 B2 * 5/2005 Clingerman et al. .......... 429/22
2003/0203253 A1 * 10/2003 Clingerman et al. .......... 429/22
2004/0053089 A1 * 3/2004 Balliet et al. .................. 429/22

FOREIGN PATENT DOCUMENTS

EP 1 037 041 A2 9/2000
WO WO 03/094278 A1 11/2003

OTHER PUBLICATIONS

Clevland, Cutler; J. Encyclopedia of Energy; Elsevier; 2004; vols. 1-6; p. 755.*

* cited by examiner

*Primary Examiner*—Dah-Wei D Yuan
*Assistant Examiner*—Katherine Turner
(74) *Attorney, Agent, or Firm*—David S. Safran; Roberts Mlotkowski Safran & Cole, P.C.

(57) ABSTRACT

A process and device for determination of the lambda value ($\lambda_{actual}$) of reformate (10) which is to be supplied to a fuel cell stack (12), by determining the lambda value ($\lambda_{actual}$) of the no-load voltage ($U_0$) of the voltage on at least one fuel cell element (14). Furthermore, a process and device for lambda control of a reformer, utilizes the process and device for determining the lambda value to controller an actuator of a lambda-controlled reformer (16) for reaction of at least fuel (20) and air (22) into reformate (10), the reformer being connected to a fuel cell stack (12) to supply reformate (10) form the reformer (16) to the fuel stack (12).

6 Claims, 2 Drawing Sheets

DETERMINATION OF THE LAMBDA VALUE OF REFORMATE

BACKGROUND OF THE INVENTION

1. Field of Invention

The invention relates to a process for determination of the lambda value of reformate which is intended to be supplied to a fuel cell stack, in which the voltage on at least one fuel cell element is evaluated for determination of the lambda value.

Furthermore, the invention relates to a process for lambda control of a reformer for reacting at least fuel and air into reformate which is intended to be supplied to a fuel cell stack.

The invention also relates to a device for determining the lambda value of reformate which is intended to be supplied to a fuel cell stack, the device having means which can evaluate the voltage on at least one fuel cell element for determining the lambda value.

Moreover, the invention relates to a system comprising a reformer for reacting at least fuel and air into reformate and a fuel cell stack which is supplied with reformate by the reformer, the reformer being lambda-controlled.

2. Description of Related Art

The generic processes, devices and systems of the type noted above are used in conjunction with the conversion of chemical energy into electrical energy. For this purpose, fuel and air, preferably in the form of a fuel/air mixture, are supplied to the reformer. The reaction of the fuel with atmospheric oxygen takes place in the reformer, preferably the process of partial oxidation being carried out.

The reformate which has been produced in this way is then supplied to a fuel cell or a fuel cell stack, electrical energy being released by controlled reaction of hydrogen as a component of the reformate, and oxygen.

As already mentioned, the reformer can be designed such that the process of partial oxidation is carried out in order to produce reformate. In this case, when using diesel as fuel, it is especially useful to carry out preliminary reactions before partial oxidation. In this way, long-chain diesel molecules can be reacted into short-chain molecules with a "cold flame;" this ultimately benefits reformer operation. In general, the reaction zone of the reformer is supplied with a gas mixture which is reacted into $H_2$ and CO. Another component of the reformate is $N_2$ from the air, and depending on the air ratio and the temperature, optionally, $CO_2$, $H_2O$ and $CH_4$. In normal operation, the fuel mass flow is adjusted according to the required output, and the air mass flow is adjusted to a lambda value or an air ratio in the region of $\lambda=0.4$. The reforming reaction can be monitored by different sensors, for example, temperature sensors and gas sensors.

In addition to the process of partial oxidation, it is likewise possible to carry out autothermal reforming. The process of partial oxidation, in contrast to autothermal reforming, is induced by oxygen being substoichiometrically supplied. For example, the mixture has an air ratio of $\lambda=0.4$. The partial oxidation is exothermal so that unwanted heating of the reformer can occur in a problematic manner. Furthermore, partial oxidation tends to increased soot formation. To prevent soot formation, the air ratio $\lambda$ can be chosen to be smaller and/or some of the oxygen used for oxidation made available by water vapor. Since oxidation proceeds endothermally with water vapor, it is possible to adjust the ratio between the fuel, oxygen and water vapor such that altogether heat is neither released nor heat consumed. The autothermal reforming which is achieved in this way therefore eliminates the problems of soot formation and undesirable overheating of the reformer.

It is likewise possible for other steps of gas treatment to take place following oxidation in the reformer, and especially methanation can be downstream of partial oxidation.

One current fuel cell system is, for example, a PEM (proton exchange membrane) system which can typically be operated at operating temperatures between room temperature and roughly 100° C. Due to the low operating temperatures, this fuel cell type is often used for mobile applications, for example, in motor vehicles.

Furthermore, high temperature fuel cells are known, so-called SOFC ("solid oxide fuel cell") systems. These systems work, for example, in the temperature region of roughly 800° C., a solid electrolyte (solid oxide) being able to take over transport of oxygen ions. The advantage of these high temperature fuel cells compared to PEM systems consists especially in durability relative to mechanical and chemical loads.

One application for fuel cells in conjunction with generic systems includes, besides stationary applications, especially applications in the motor vehicle domain, for example as an auxiliary power unit (APU).

To determine the lambda value of reformate, in the prior art, a sensor (lambda probe) which is provided in the output area of the reformer is often used to measure the oxygen concentration. This constitutes an additional material expenditure which is associated with high costs. Furthermore, tightness problems and/or temperature problems can occur.

3. Description of Related Art

International patent application publication WO 03/094278 A1 discloses generic processes, devices and systems in which a separate lambda probe can be eliminated. According to the teaching of this publication, the lambda value is deduced via the output voltage on one or more fuel cell elements. For this purpose, the pairs of values measured for different operating states from the output voltage and the lambda value are stored. The detection of these pairs of values by measurement engineering is, however, complex and associated with high costs.

SUMMARY OF THE INVENTION

A primary object of the present invention is to develop the generic processes, devices and systems such that the lambda values can be determined economically.

This object is achieved by a process and device in which the evaluated voltage on at least one fuel cell element is the no-load voltage of at least one fuel cell element.

The process in accordance with the invention for determining the lambda value is based on the generic prior art but departs in that the evaluated voltage on at least one fuel cell element is the no-load voltage of at least one fuel cell element. The no-load voltage is less strongly dependent on the instantaneous operating conditions than the voltage on the fuel cell element from which current is taken. If determination of the lambda value in the process of the invention takes place via stored pairs of values from the no-load voltage and the pertinent lambda value, a number of pairs of values which is smaller than in the prior art is enough, so that the measurement engineering cost and the cost for storage of the pairs of values are reduced. Preferably, the determination of the lambda value in the process of the invention does not take place via stored pairs of values, but by computation; this is likewise possible by using the no-load voltage as a function variable.

In this case, for the process in accordance with the invention, for determining the lambda value, it is preferred that the lambda value can be deduced via the Nernst equation. This is possible since the no-load voltage of the fuel cell element which is operated without current obeys the Nernst equation.

The process of the invention for lambda control of a reformer is based on the generic prior art in that lambda control is carried out on the basis of lambda values but departs in that these values are determined with the process of the invention. In this case, the effort necessary for determining the lambda value is also clearly reduced compared to the prior art.

The device as in accordance with the invention for determining the lambda value is based on the generic prior art, but the means for determining the lambda value evaluate the no-load voltage of at least one fuel cell element instead. The means which are intended for determining the lambda value can be implemented by analog or digital circuits known to one skilled in the art, especially by hardware which interacts with suitable software.

In the case of the device of the invention, it is also preferred that the means deduce the lambda value via the Nernst equation. Determination of the lambda value can take place by direct evaluation of the Nernst equation, via suitable characteristics or any other suitable manner obvious to one skilled in the art.

The system of the invention is based on the generic prior art but, for executing lambda control, it comprises the device in accordance with the invention for determining the lambda value.

The important basic idea of the invention is that no-load operation of at least one fuel cell element of a fuel cell stack which has a host of fuel cell elements, enables reliable and economical determination of the lambda value of the reformate.

Preferred embodiments of the invention are explained below by way of example with reference to the accompanying drawings.

DETAILED DESCRIPTION OF THE INVENTION

Figure 1:
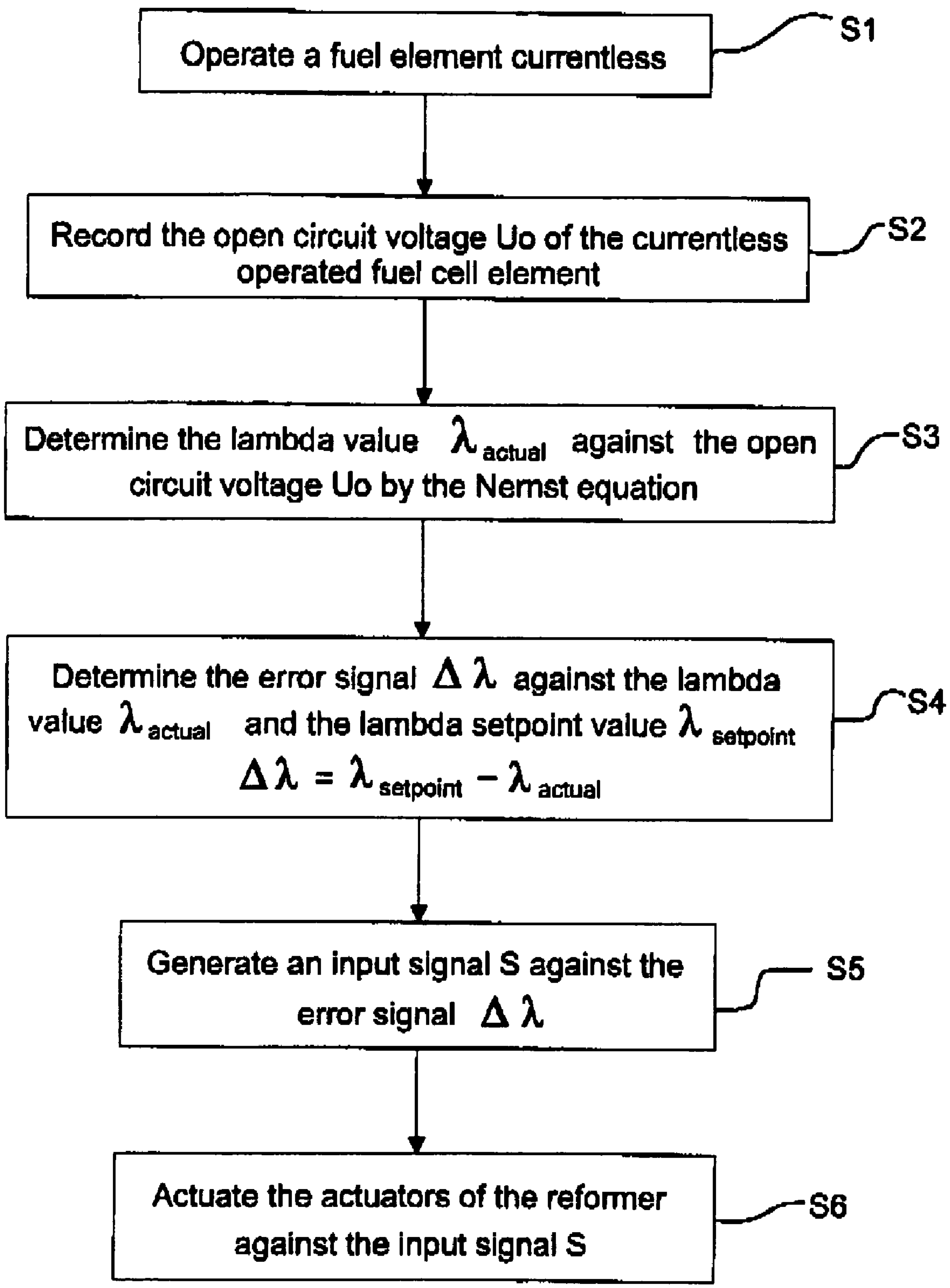
FIG. 1 is a flow chart which illustrates one embodiment of the process of the invention.

The steps S1 to S3 shown in FIG. 1 illustrate one embodiment of the process of the invention for determining the lambda value, while steps S1 to S6 show one embodiment of the process in accordance with the invention for lambda control of a reformer.

According to the illustrated step S1, a fuel cell element of a fuel cell stack which has a host of fuel cell elements is operated at zero current. Of course, embodiments are also possible in which more than one fuel cell element is operated at zero current.

In step S2, the no-load voltage $U_0$ of the fuel cell element which is operated at zero current is detected. This can take place via any means which operate in an analog and/or digital manner which is known to one skilled in the art.

In step S3, the lambda value $\lambda_{actual}$ is determined via the Nernst equation as a function of the no-load voltage $U_0$. This is possible since the no-load voltage $U_0$ of a fuel cell element which is operated at zero current obeys the Nernst equation.

In step S4, the control difference $\Delta\lambda$ is determined as a function of the lambda value $\lambda_{actual}$ and lambda setpoint $\lambda_{set}$ via the relation $\Delta\lambda - \Delta_{set} - \Delta_{actual}$.

Then, in step S5, an actuating signal S is produced as a function of the control difference $\Delta\lambda$.

In step S6, at least one actuator is actuated depending on the actuating signal S. One or more actuators can be assigned especially to the reformer, and for example, can vary the supply of air and fuel. If there are several actuators, the actuating signal S preferably contains a plurality of data which are suitable for respective triggering of the actuators.

Figure 2:
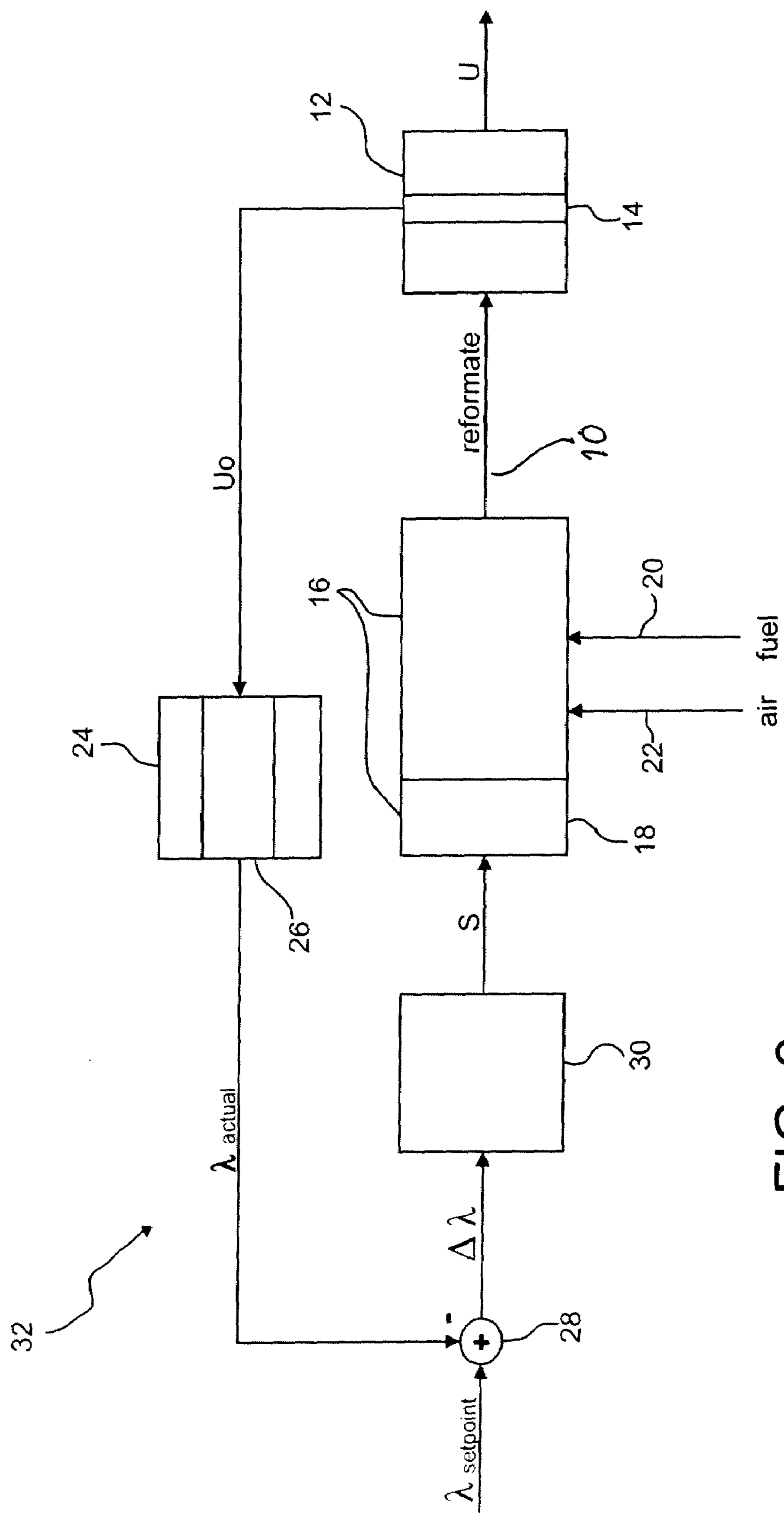
FIG. 2 is a block diagram which illustrates one embodiment of the device in accordance with the invention.

FIG. 2 shows a block diagram which illustrates both one embodiment of the device in accordance with the invention and also one embodiment of the system of the invention. The device 24 in accordance with the invention can be implemented by hardware and/or software know to one skilled in the art and is designed for determining the lambda value $\lambda_{actual}$ of the reformate 10. The reformate 10 is produced by a reformer 16 and is supplied to a fuel cell stack 12. The fuel cell stack 12 comprises a host of fuel cell elements, of which, in the illustrated case, one fuel cell element 14 is operated at zero current so that this fuel cell element 14 delivers a no-load voltage $U_0$. The device 24 of the invention comprises means 26 which evaluate the no-load voltage $U_0$ of the fuel cell element 14 for determining the lambda value $\lambda_{actual}$. The means 26 determine the lambda value $\lambda_{actual}$ preferably via the Nernst equation.

The device 24 in accordance with the invention is a component of a system 32 of the invention and which, in addition to the device 24, furthermore, comprises a reformer 16 for reacting fuel 20 and air 22 into reformate 10 and a fuel cell stack 12 which is supplied by the reformer 16 with reformate 10 and which, in addition to the no-load voltage $U_0$ of the fuel cell element 14, delivers an output voltage U. The illustrated system furthermore comprises an adder 28 which produces a control difference $\Delta\lambda$ from the lambda setpoint $\lambda_{set}$ and the actual lambda value $\lambda_{actual}$. This control difference $\Delta\lambda$ is supplied to a controller 30 which is likewise assigned to the system 32 and which outputs one or more suitable actuating signals S depending on the control difference $\Delta\lambda$. In the illustrated case the actuating signal S is supplied to an actuator 18 which is a component of the reformer 16. The actuator 18 can, for example, influence the supply of fuel 20 and/or air 22.

The features of the invention disclosed in the description above, the drawings and in the claims can be important both individually and also in any combination for implementation of the invention.

What is claimed is:

1. Process for determination of the lambda value of reformate which to be supplied to a fuel cell stack having a plurality of fuel cells, comprising the steps of:

determining the no-load voltage of at least one fuel cell element that is operated at zero current while other of the fuel cells are able to continue providing electricity, and determining a lambda value on the basis of the no-load voltage on the at least one fuel cell element that has been determined.

2. Process as claimed in claim 1, wherein the lambda value is determined via the Nernst equation.

3. Process for lambda control of a reformer for reacting at least fuel and air into reformate to be supplied to a fuel cell stack having a plurality of fuel cells, comprising the steps of:

determining the no-load voltage of at least one fuel cell element that is operated at zero current while other of the fuel cells are able to continue providing electricity, evaluating a lambda value on the basis of the no-load voltage on the at least one fuel cell element that has been determined, and performing lambda control on the basis of the lambda values which have been determined.

4. Device for determining a lambda value of reformate to be supplied to a fuel cell stack having a plurality of fuel cells, comprising:

means for evaluating the no load voltage on at least one fuel cell element that is operated at zero current while other of the fuel cells are able to continue providing electricity, means for determining the lambda value on the basis of the no-load voltage of the at least one fuel cell element by said means for evaluating.

5. Device as claimed in claim 4, wherein the means determining the lambda value does so via the Nernst equation.

6. System comprising:

a reformer for reacting at least fuel and air into reformate, a fuel cell stack having a plurality of fuel cells and which is connected with the reformer for receiving reformate therefrom, and a device for determining a lambda value of reformate to be supplied to a fuel cell stack from the reformer, comprising:

means for evaluating the no load voltage on at least one fuel cell element that is operated at zero current while other of the fuel cells are able to continue providing electricity, determining means for determining the lambda value on the basis of the no-load voltage of the at least one fuel cell element by said means for evaluating, and a lambda controller for controlling the reformer on the basis of the lambda value determined by said determining means.

* * * * *